US010476747B1

(12) United States Patent
Tönsing

(10) Patent No.: US 10,476,747 B1
(45) Date of Patent: Nov. 12, 2019

(54) LOADING A FLOW TRACKING AUTOLEARNING MATCH TABLE

(71) Applicant: Netronome Systems, Inc., Santa Clara, CA (US)

(72) Inventor: Johann H. Tönsing, Zwartkop (ZA)

(73) Assignee: Netronome Systems, Inc., Santa Clara, CA (US)

( * ) Notice: Subject to any disclaimer, the term of this patent is extended or adjusted under 35 U.S.C. 154(b) by 525 days.

(21) Appl. No.: 14/923,460

(22) Filed: Oct. 27, 2015

(51) Int. Cl.
*H04L 12/24* (2006.01)
*H04L 12/751* (2013.01)
*H04L 12/935* (2013.01)

(52) U.S. Cl.
CPC .............. *H04L 41/12* (2013.01); *H04L 45/02* (2013.01); *H04L 45/08* (2013.01); *H04L 49/3009* (2013.01)

(58) Field of Classification Search
CPC ..... H04L 41/12; H04L 49/3009; H04L 45/08; H04L 45/02
See application file for complete search history.

(56) References Cited

U.S. PATENT DOCUMENTS

| 2004/0230645 | A1* | 11/2004 | Bodin | H04L 12/2805 709/202 |
| 2009/0052445 | A1* | 2/2009 | Folkes | H04L 45/54 370/389 |
| 2013/0250965 | A1* | 9/2013 | Yakan | H04L 45/021 370/401 |
| 2014/0126367 | A1* | 5/2014 | Stark | H04L 45/30 370/235 |
| 2017/0134277 | A1* | 5/2017 | Bifulco | H04L 45/38 |

* cited by examiner

*Primary Examiner* — Chirag G Shah
*Assistant Examiner* — Joshua Smith
(74) *Attorney, Agent, or Firm* — Imperium Patent Works LLP; T. Lester Wallace; Mark D. Marello

(57) ABSTRACT

A networking device includes: 1) a first processor that includes a match table, and 2) a second processor that includes both a Flow Tracking Autolearning Match Table (FTAMT) as well as a synchronized match table. A set of multiple entries stored in the synchronized match table is synchronized with a corresponding set of multiple entries in the match table on the first processor. The FTAMT, for a first packet of the flow, generates a Flow Identifier (ID) and stores the flow ID as part of a new entry for the flow. The match of a packet to one of the synchronized entries in the synchronized match table causes an action identifier to be recorded in the new entry in the FTAMT. A subsequent packet of the flow results in a hit in the FTAMT and results in the previously recorded action being applied to the subsequent packet.

20 Claims, 10 Drawing Sheets

NETWORKING DEVICE

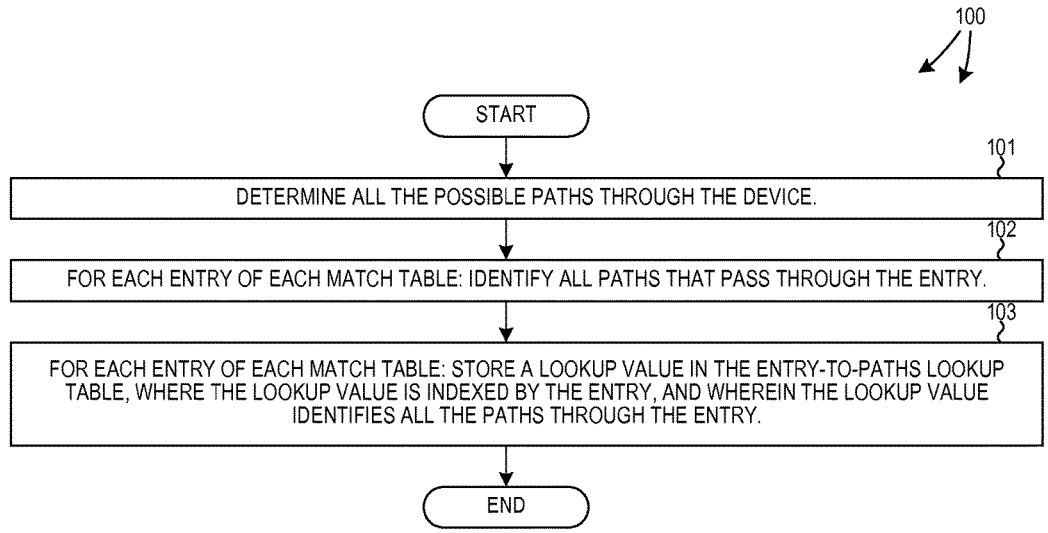
METHOD OF LOADING THE ENTRY-TO-PATHS
LOOKUP TABLE
FIG. 3
|  | A | B | C | D | E | F |  |
|---|---|---|---|---|---|---|---|
| PACKET A | 4 | 7 | 1 | 8 | 3 | 4 | PAYLOAD A |
| PACKET B | 3 | 2 | 9 | 9 | 1 | 5 | PAYLOAD B |
| PACKET C | 4 | 6 | 9 | 9 | 3 | 4 | PAYLOAD C |
PACKETS
FIG. 4
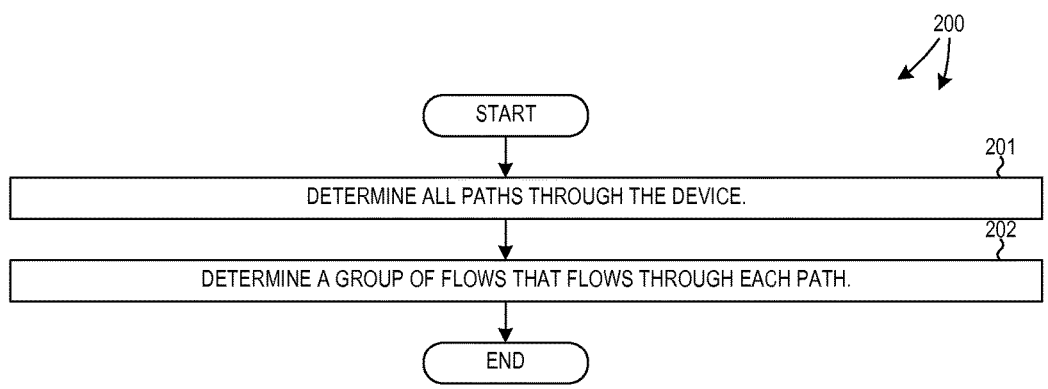
METHOD OF LOADING THE FLOW SET-TO-PACKET
COUNT INDEX LOOKUP TABLE
FIG. 6

FLOW SET-TO-PACKET COUNT INDEX LOOKUP
TABLE

| ENTRY | PATHS | |
|---|---|---|
| (T1A,1) | (T0,1) (T1A,1) (T2A,1) | |
| (T2A,1) | (T0,1) (T1A,1) (T2A,1) | |
| | (T0,2) (T2A,1) | |
| | (T0,3) (T2A,1) | |
| | (T0,4) (T2A,1) | |
| (T2A,2) | (T0,2) (T2A,1) | |
| | (T0,3) (T2A,1) | |
| | (T0,4) (T2A,1) | |

ENTRY-TO-PATHS LOOKUP TABLE

ARRAY OF PACKET COUNTS

ENTRY

METHOD OF RESPONDING TO A REQUEST FOR A SYSTEM ENTRY PACKET COUNT - ON DEMAND GENERATION OF A SYSTEM ENTRY PACKET COUNT

SYSTEM ENTRY PACKET COUNT REQUEST

SYSTEM ENTRY PACKET COUNT RESPONSE

LOADING A FLOW TRACKING AUTOLEARNING MATCH TABLE

TECHNICAL FIELD

The disclosed embodiments relate to networking devices, and to related structures and methods.

SUMMARY

A networking device includes a host computer and a Network Interface Device (NID). The NID may, for example, be a Network Interface Card (NIC) that is coupled to the host via a bus. The networking device receives and processes packets using both the host computer and the NID, or solely using the NID. Match tables are stored in the host computer in accordance with an open source Software-Defined Networking (SDN) standard, such as OpenV Switch. The match tables in user mode space on the host include multiple entries. Each entry includes, or is associated with, an entry packet count value that indicates the number of times the entry has been matched. When desired, an entry count request can be sent to the networking device so that the networking device will respond with an indication of the entry packet count value for the particular entry of the particular match table indicated by the request. However, given that that the NID can perform all processing on certain packets, even though the SDN match tables on the host include entries that would have experienced matches had those packets actually been handled by the host, a novel method is employed to determine the correct entry packet count value as if all packets were handled by the host.

In a first novel aspect, a networking device includes a Network Interface Device (NID) and a host. Packets are received onto the networking device via the NID. Some of the packets pass along paths from the NID to the host, whereas others of the packets are made to bypass the host and do not pass to the host but rather are processed entirely by the NID. A bypass packet count for each path that passes from the NID to the host is maintained on the NID. It is determined, using the match tables, that one of the packets received on the NID should, according to the match tables, be sent to the host; however, the packet is instead sent along a bypass path through the NID without going through the host. The path that the packet would have traversed through the host had the packet not been sent along the bypass path is determined and the bypass packet count associated with this path is incremented. For a non-bypass packet that actually passes to the host, none of the bypass packet counts is incremented. In this way, a set of bypass packet counts is maintained on the NID.

In a second novel aspect, a networking device includes a match table maintained on a first processor (for example, a host). The match table includes an entry that in turn includes an entry packet count. Packets of multiple flows result in matches to this entry. A set of bypass packet counts is maintained on a second processor (for example, a NID) in the networking device. There is one bypass packet count for each of the multiple paths through which packets can pass through the host. If a bypass packet is sent through the NID, where the packet according to the host match tables should have resulted in a match of a particular entry in a particular match table of the host, then the entry packet count of the entry on the host is not incremented. The entry packet counts recorded in the entries of the match tables of the host are therefore not necessarily the correct system entry packet counts. A request for a "system entry packet count" of an entry located in a match table on the host is then received onto the networking device. All paths of all flows that could have resulted in matches of that entry are determined using an entry-to-paths lookup table. The system entry packet count is then determined based on the entry packet count (as recorded in the entry of the match table on the host) and the bypass packet counts for all the paths that could have resulted in matches of the entry (the bypass packet counts are maintained on the NID). Typically, the "system entry packet count" is a summation of all these counts. A response to the request is generated and is output from the networking device. The response includes the determined "system entry packet count". The newly determined "system entry packet count" may then be written over the entry packet count of the entry in the host. The generation of the "system entry packet count" is "on-demand" in the sense that correct "system entry packet count" is not necessarily stored anywhere in the networking device, but rather the correct "system entry packet count" is only calculated in response to a request for that count.

In a third novel aspect, a networking device includes: 1) a first processor that includes a match table, and 2) a second processor that includes both a novel Flow Tracking Autolearning Match Table (FTAMT) as well as a synchronized match table. A set of multiple entries stored in the synchronized match table is synchronized with a corresponding set of multiple entries stored in the match table on the first processor. The FTAMT includes an exact match table. A first packet of a flow is received onto the networking device via the second processor and the FTAMT. The FTAMT generates a Flow Identifier (ID) for the first packet. There is no entry in the FTAMT for the flow of the first packet, so there is a "miss" in the FTAMT. The FTAMT stores a new entry for the flow, where the new entry includes the flow ID. When another match table determines the action to be performed on the flow, then an action identifier indicative of the action is recorded in the new entry in the FTAMT. The new entry in the FTAMT at this point includes the flow ID as well as the recorded action identifier. A subsequent packet of the flow is then received onto the networking device via the second processor and the FTAMT. A flow ID is generated for the subsequent packet. The flow ID of the subsequent packet is used to perform a lookup in the FTAMT. The flow ID of the subsequent packet matches the flow ID of the new entry. As a result, there is an entry "hit" in the FTAMT. The matching entry in the FTAMT includes the previously recorded action identifier, so the action indicated by the action identifier is carried out. In one example, the action indicated by the action identifier is an action that can be carried out entirely by the second processor, so the processing of the subsequent packet is carried out entirely by the second processor without involvement by the first processor. In one example, the recording of the action identifier into new entry in the FTAMT is performed entirely on the second processor and does not involve the first processor.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 is a flowchart illustrating a method of loading an entry-to-paths lookup table.

FIG. 4 is a diagram illustrating the contents of a first packet A, a second packet B, and a third packet C.

FIG. 6 is a flowchart illustrating a method of loading a flow set-to-packet count index lookup table.

DETAILED DESCRIPTION

Reference will now be made in detail to some embodiments of the invention, examples of which are illustrated in the accompanying drawings.

Figure 1:
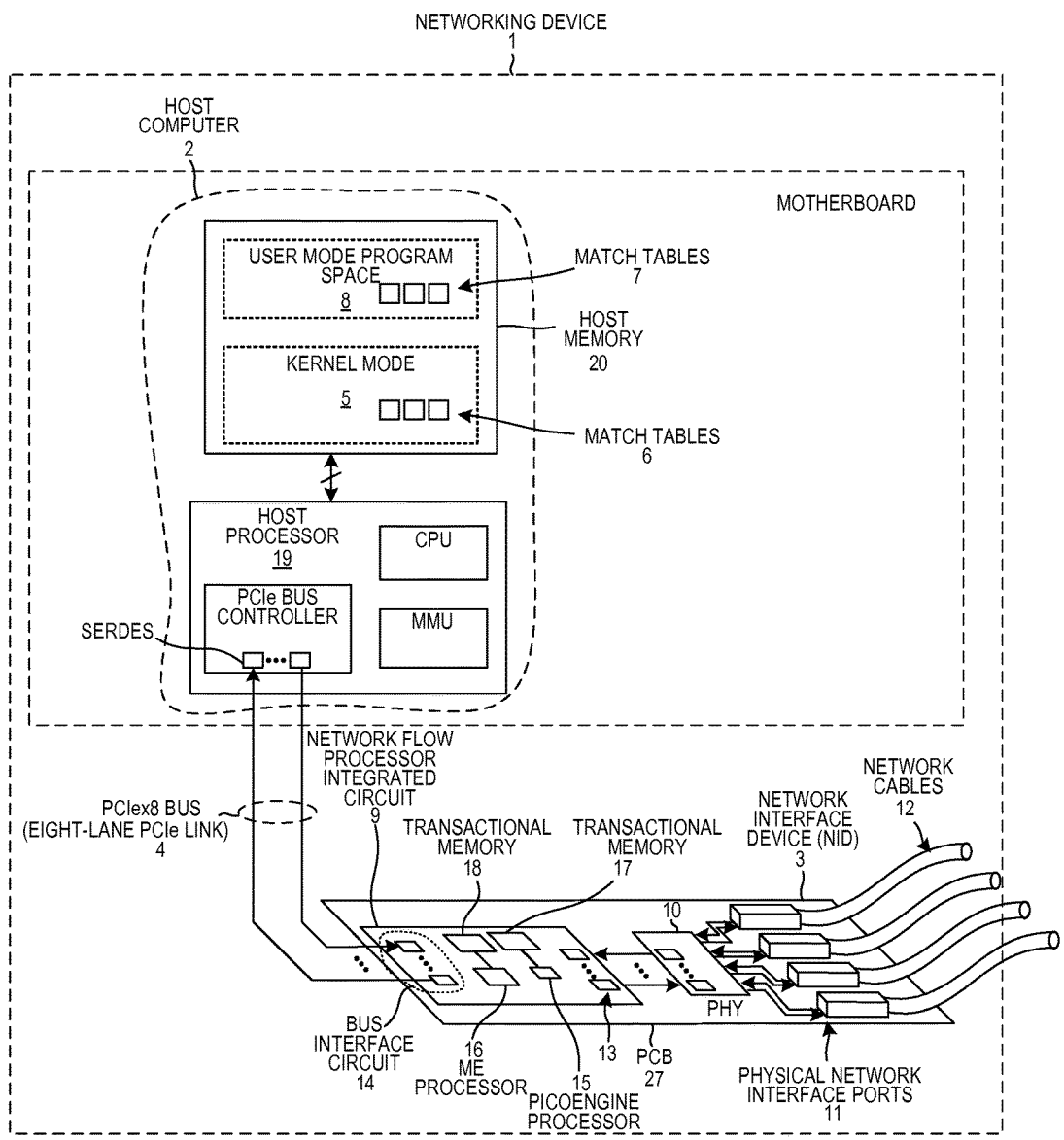
FIG. 1 is a diagram of a networking device that includes a host computer and a Network Interface Device (NID).

FIG. 1 is a diagram of a networking device 1. The networking device 1 includes host computer 2 and a Network Interface Device (NID) 3. The NID 3 is coupled to the host via a PCIe bus 4. The host 2 executes an operating system, where the kernel 5 of the operating system includes multiple match tables 6. In addition, there are also multiple match tables 7 in user mode program space 8. In the illustrated example, the NID 3 is a Network Interface Card (NIC) that includes a Network Flow Processor (NFP) integrated circuit 9, a physical layer interface circuit (PHY) 10 and multiple bidirectional network interface ports 11. The NIC plugs into, or couples to, a motherboard upon which the host computer 2 is realized. For additional information on Network Flow Processor (NFP) integrated circuit 9, see: U.S. patent application Ser. No. 13/399,888, entitled "Island-Based Network Flow Processor Integrated Circuit", filed Feb. 17, 2012, by Gavin J. Stark (the subject matter of which is incorporated herein by reference).

The NID can send packets out of the network interface ports and can receive packets via the network interface ports. In one example, the network interface ports are QSFP ports that include optical transceivers, and the network cables 12 are optical cables for bidirectional communication. The NFP integrated circuit 9 includes SerDes interface circuitry 13 for communicating with the PHY, and also includes SerDes interface circuitry 14 for communicating information across the PCIe bus 4 to the host. In addition, the NFP integrated circuit 9 includes a PicoEngine (PE) processor 15, and a MicroEngine (ME) processor 16, and memory resources including a first transactional memory 17 accessible by the PE processor 15 and a second transactional memory 18 accessible by the ME processor 16. The NFP integrated circuit 9 is available as an NFP-6480 integrated circuit that is commercially available from Netronome Systems, Inc., 2903 Bunker Hill Lane, Santa Clara, Calif. 95054. In one example, the host is a commercially-available server card that includes a 4 Tbyte spinning hard disk, 8 GB of SRAM, and a host processor 19 such as an Intel E3-20-12V Central Processing Unit (CPU). The hard disk and the SRAM are considered together to be host memory 20. For additional information on PicoEngine (PE) processor 15 and transactional memory 17, see: U.S. patent application Ser. No. 13/970,601, entitled "Picoengine Pool Transactional Memory Architecture", filed Aug. 20, 2013, by Gavin J. Stark (the subject matter of which is incorporated herein by reference).

Figure 2:
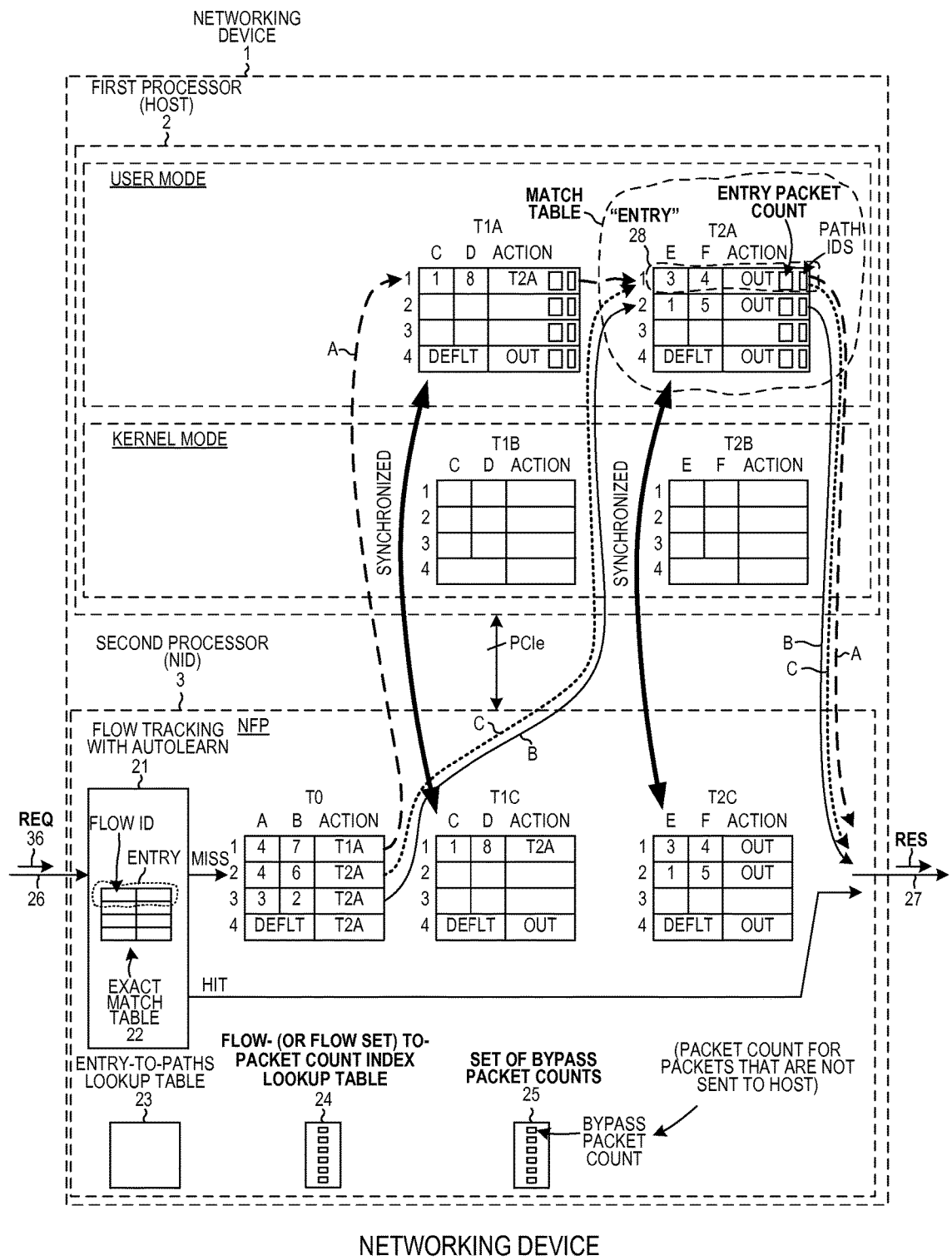
FIG. 2 is a diagram of a networking device that maintains bypass packet count values and performs on-demand generation of system entry packet counts, in accordance with a first novel aspect and a second novel aspect.

FIG. 2 is an abstraction of the structure of FIG. 1 in accordance with the first and second novel aspects. The match tables T1A and T2A in the user mode space are OpenV Switch compliant. There are two match tables T1B and T2B in the kernel mode space. The NID 3 includes a novel Flow Tracking with Autolearning Match Table (FTAMT) functionality 21, and three match tables T0, T1C and T2C. The FTAMT functionality 21 in turn includes an exact match table 22 and lookup capability. In one example, the FTAMT functionality 21 is implemented by PE processor 15 and transactional memory 17 of FIG. 1, where the PE processor 15 is programmed to carry out the functions of the FTAMT functionality 21, and where lookup functions of transactional memory 17 are used to implement the exact match table 22. In another example, the FTAMT functionality 21 is implemented by ME processor 16 and transactional memory 18 of FIG. 1, where the ME processor 16 is programmed to carry out the functions of the FRAMT functionality 21, and where lookup functions of transactional memory 18 are used to implement the exact match table 22.

Operation of the match tables in the kernel mode and on the NID is transparent to the user mode. From the perspective of the user mode, the match tables T1A and T2A fully define the operation of the networking device. In the particular example set forth in FIG. 2, the T1C match table in the NID is synchronized with respect to the T1A match table in user mode space, and the T2C match table in the NID is synchronized with respect to the T2A match table in user mode space. The term synchronized here means that the entries in the two tables are functionally the same, and as the networking device 1 operates, are updated to remain functionally the same. In addition to the match tables, the NID 3 includes an entry-to-paths lookup table 23, a flow set-to-packet count index lookup table 24, and a set of bypass packet counts 25. Arrow 26 represents a path into the NID 3 via one of the network cables 12, and arrow 27 represents a path out of the NID 3 via one of the network cables 12.

FIG. 3 is a flowchart of a method 100 of loading the maintaining the entry-to-paths lookup table 23. There are multiple entries that can be stored in match tables in the networking device. A particular entry can be identified by a first value that specifies the table where the entry is found, and where the second value specifies the number of the entry in the table. For example, the second entry in the T2A table can be identified by the identifier (T2A,2). There are multiple paths that a packet can take through the networking device. For example, a first packet A may be of the form illustrated in FIG. 4. If the packet A is received onto the NID 3, then the packet may follow a path A. Because the A field of the packet is a value 4 and the B field of the packet is a 7, then packet A matches the first entry in match table T0. The action identifier T1A of this entry indicates that the packet is to be sent on to the T1A match table for possible further matching. In the diagram of FIG. 2, the arrow labeled "A" between the T0 match table and the T1A match table indicates this transfer of packet A. Because the C field of packet A is a 1 and the D field of packet A is an 8, packet A matches the first entry in the T1A match table. The looked up action identifier of the first entry is T2A. This action identifier indicates that packet A is to be forwarded to the T2A match table for possible further matching. Because the E field of packet A is a 3 and the F field of packet A is a 4, packet A matches the first entry in the T2A match table. The looked up action identifier of this entry is OUT. This action identifier OUT indicates that the packet is to be output from the NID. Accordingly, the path followed by the packet A is determined to be (T0,1)(T1A,1)(T2A,1). This same process is followed for the other packets (packet B and packet C) of FIG. 4. In addition to the paths where each match table returns a hit, there are also other paths where there is no matching entry for a particular match table and a miss is returned. In the event of a miss, the action identifier associated with the default value is determined to be the action value of the lookup. Using this exhaustive analysis of every possible packet, and how it would pass through the networking device, all the possible paths are determined (FIG. 3; step 101).

Figures 5, 7:
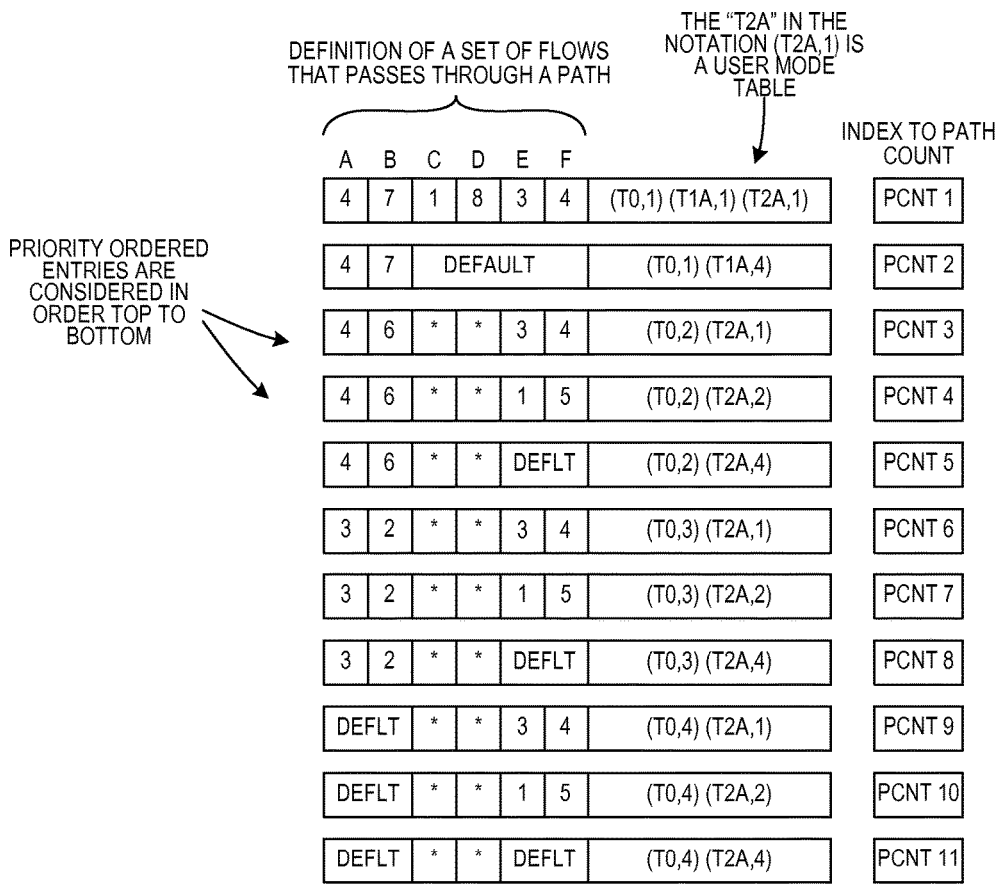
FIG. 5 is a diagram of a flow set-to-packet count index lookup table.
FIG. 7 is a diagram of entry-to-path lookup table.

FIG. 5 is a diagram that illustrates the "flow set-to-packet count index lookup table" 24. Note that there is one row in the table for each possible path through the networking device 1. Each path has an associated path identifier or index. For example, the path identifier or index of the path set forth in the first row of the table is denoted "PCNT1".

FIG. 6 is a flowchart of a method 200 of loading the "flow set-to-packet count index lookup table" of FIG. 5. All paths through the networking device are determined (FIG. 6; 201) as described above, and then for each possible path through the networking device a description of the set of flows that follows that path is recorded in the table (FIG. 6; 202). In the example of FIG. 5, the descriptions of the flows are priority ordered. The first row of the table contains a description of all flows that pass along the first path PCNT1. The set of flows in this case is a single microflow whose A field contains a value 4, whose B field contains a value 7, whose C field contains a value 1, whose D field contains a value 8, whose E field contains a value 3, and whose F field contains a value 4.

Once all the paths through the networking device have been determined (FIG. 3; step 101), then each entry in the networking device 1 is considered to determine which paths involved matches of that entry (FIG. 3; 102). To determine the paths that involved matches of the (T2A,1) entry, for example, the table of FIG. 5 is consulted. The index of each path that includes the (T2A,1) entry is recorded. Four different paths include the entry (T2A,1): the path having the PCNT1 identifier, the path having the PCNT3 identifier, the path having the PCNT6 identifier, and the path having the PCNT9 identifier. At this point, the paths associated with the entry (T2A,1) are known. Identifiers of these four paths are recorded (FIG. 3; 103) in the "entry-to-paths lookup table" of FIG. 7. This same process is performed for each of the entries of the networking device, such that the "entry-to-paths lookup table" of FIG. 7 is filled out.

Figure 8:
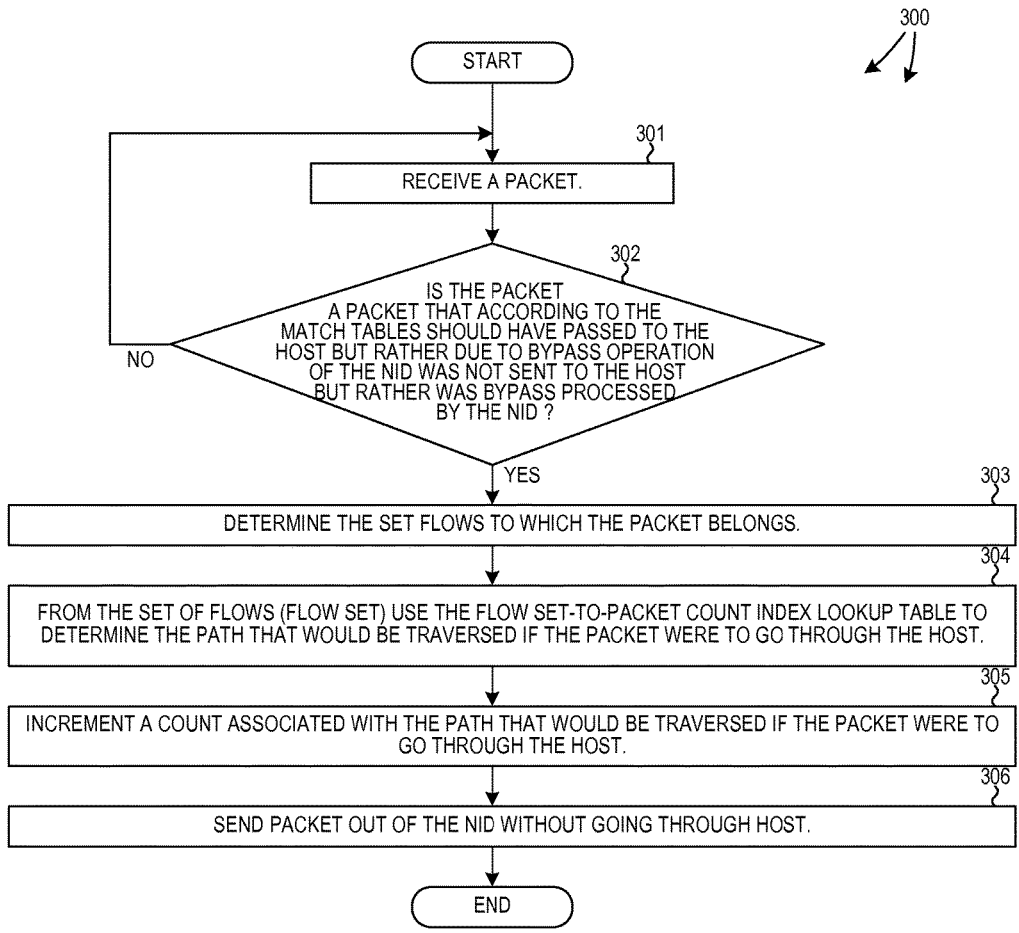
FIG. 8 is a flowchart illustrating a method of updating path count values upon sending a packet through an alternative path that does not traverse the host.
Figure 9:
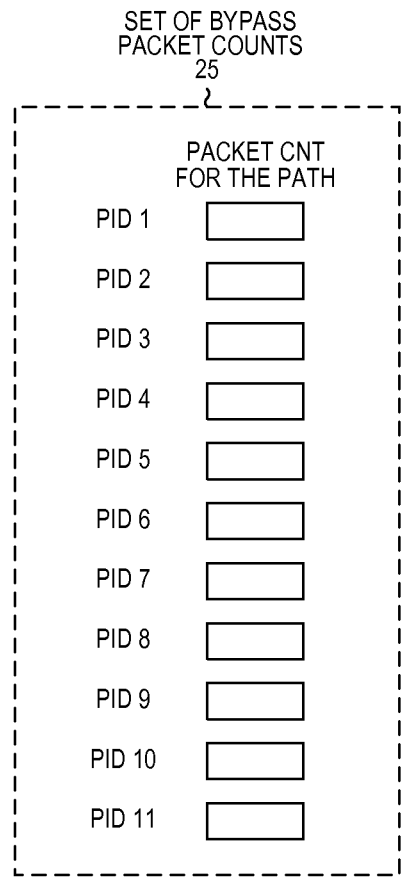
FIG. 9 is a diagram of an array of packet counts.

FIG. 8 is a flowchart of a method 300 of updating path count values in the set of bypass packet counts 25 of FIG. 2. The set of bypass packet counts 25 is shown in further detail in FIG. 9. A packet is received onto the NID (FIG. 8; 301). If the packet is not a packet that according to the match tables should have passed to the host but rather was bypassed by the NID (and not sent along its proper path to the host) (FIG. 8; 302), then none of the bypass packet counts is updated and processing returns to step 301. If, on the other hand, the packet is a packet that according to the match tables should have passed to the host but rather was bypassed by the NID and not sent to the host, then the particular set of flows to which the packet belongs is determined (FIG. 8; 303). The different "sets of flows" are the sets of flows (or "flow sets") indicated in the table of FIG. 5. Once the particular "set of flows" to which the packet belongs has been determined, then the "flow set-to-packet count index lookup table" is used (FIG. 8; 304) to determine the path that the packet would have traversed had the packet gone through the host according to the match tables. The looked up "index to path count" value indicates or points to the "bypass packet count" for this path. The indicated or pointed to "bypass packet count" (in the set of bypass packet counts of FIG. 9) is then incremented (FIG. 8; 305). The packet is sent out the NID without passing through the host (FIG. 8; 306).

Figure 10:
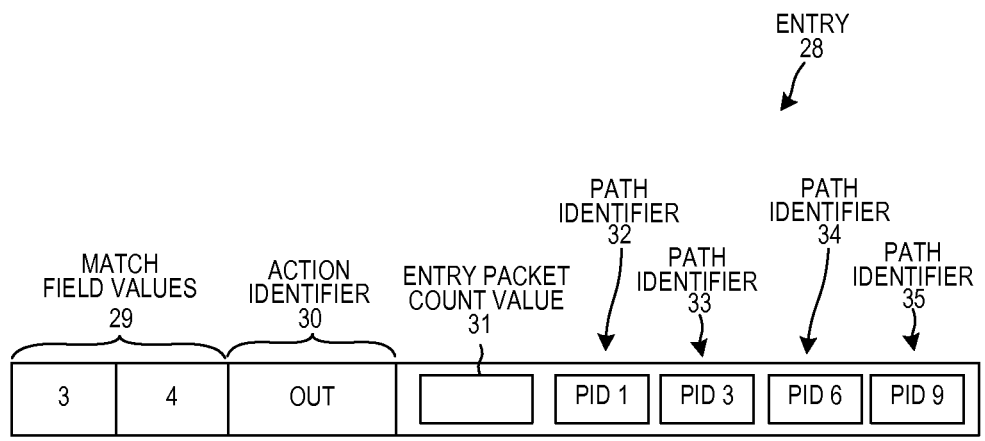
FIG. 10 is a diagram of an entry in a match table.

FIG. 10 is a diagram of an entry 28 of a match table of the host. The entry 28 includes a set of match field values 29 in a corresponding set of a match fields, an action identifier 30 in an action identifier field, an entry packet count value 31, and one or more path identifiers. For every packet that results in a match for this entry, the host causes the entry packet count value 31 of the entry 28 to be incremented. The entry packet count value 31 therefore records the number of matches that occurred for this entry on the host. The path identifiers indicate all the paths, the packets of which result in matches of the entry. In the example of the entry 28 of FIG. 2, there are four paths that go through the entry 28 as indicated by the "flow set-to-packet count index lookup table" of FIG. 5, so there are four path identifiers 32-35 stored in the entry 28: PCNT1, PCNT3, PCNT6, and PCNT9.

Figure 11:
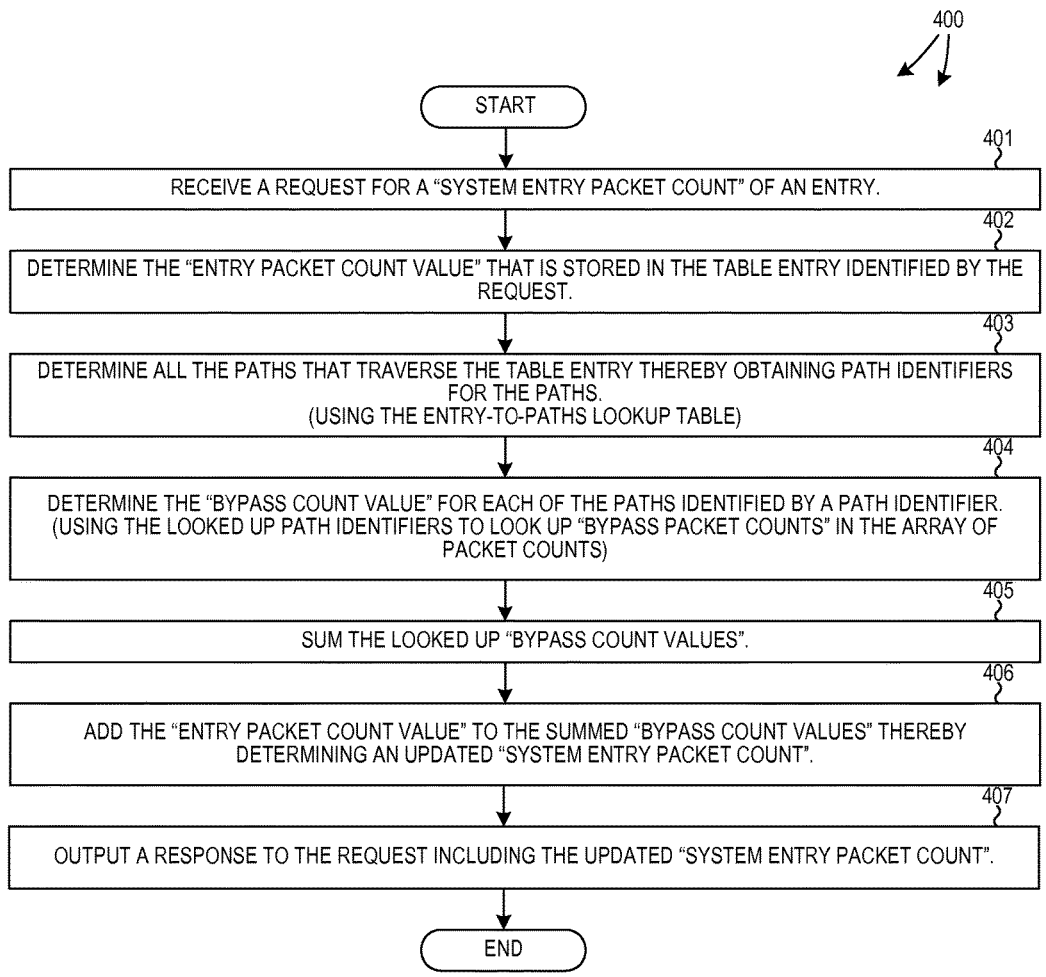
FIG. 11 is a flowchart illustrating a method of responding to a system entry count request, and of on-demand generation of a system entry packet count, in accordance with the second novel aspect.

FIG. 11 is a flowchart of a method 400 of responding to a request 36 for the "system entry packet count" of a particular entry of a particular match table on the host, and of on-demand generation of the "system entry packet count", in accordance with the second novel aspect. During operation, the NID of the networking device 1 receives packets that should, according to the match tables in user space, be sent to and be handled by the host 2. The flow tracking with autolearning match table functionality 21, however, analyzes the packet and determines that the NID has the capability to handle the packet and to perform the necessary action or actions. The NID therefore performs the actions itself and does not forward the packet to the host. The packet is said to "bypass" the host. The packet may go straight out of the NID without involvement of any other match table on the NID, or the packet may pass through a path on the NID that traverses one of more match tables on the NID. This bypassing is done transparently to the host, and the resulting processing performed by the overall networking device is consistent with the setup of the match tables in user mode space. As a result of this bypassing, processing demands on the host are reduced and host processing is offloaded to the NID. Specified actions to be performed on the NID may include processing done on packets and packet data by ME processor 16 of FIG. 1. Specified actions to be performed on the NID may also include egress processing as performed by a script-controlled egress packet modifier of the Network Processor Integrated Circuit 9 of FIG. 1. For more information on the script-controlled egress packet modifier, see: U.S. Pat. No. 9,124,644, entitled "Script-Controlled Egress Packet Modifier", filed Jul. 14, 2013, by Chirag P. Patel et al. (the entire subject matter of which is incorporated herein by reference).

In the case of other packets, however, the flow tracking with autolearning match table functionality 21 does not interfere with the forwarding of packets as set up by the match tables. Because some packets that should have been passing through match tables on the host do not pass through the host but rather are bypassed directly through the NID, the "entry packet counts" stored in the entries on the host may be erroneously low by the number of bypassed packets. Despite this situation, an external device may request that the networking device 1 return to it the proper "system entry packet count" for a particular entry, and the networking device 1 should respond with the correct value.

Figure 12:
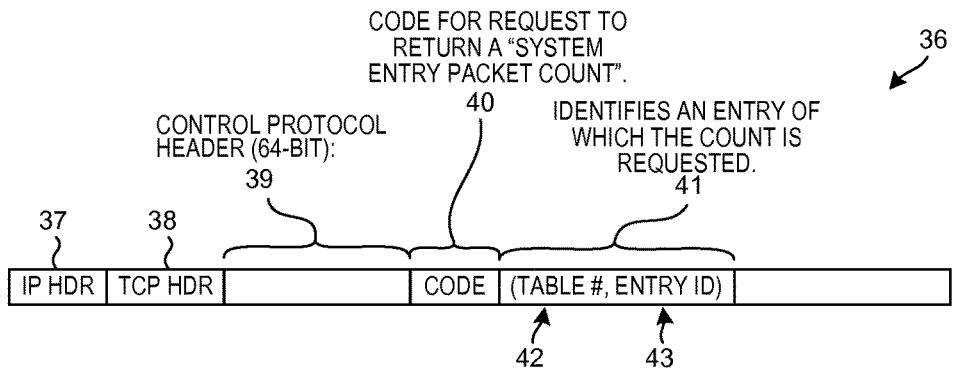
FIG. 12 is a diagram of a system entry count request.

In a first step (FIG. 11; 401), the request 36 is received onto the NID 3 like all other packets via one of the networking cables 12. In present example, the request 36 is a packet of the form shown in FIG. 12. The request 36 is an IP packet having an IP header 37 and a TCP header 38. The payload of the packet in turn includes a control protocol header 39 that indicates that the packet is a control packet. A code 40 indicates the type of control packet, which in this case is a request to return a "system entry packet count" for a particular entry indicated the following field 41. The particular entry, the "system entry packet count" of which is to be returned, is indicated by a match table identifier 42 (for example, T2A) and the associated entry identifier 43 (for example, the number "1" to denote the first entry in the indicated match table).

Figure 13:
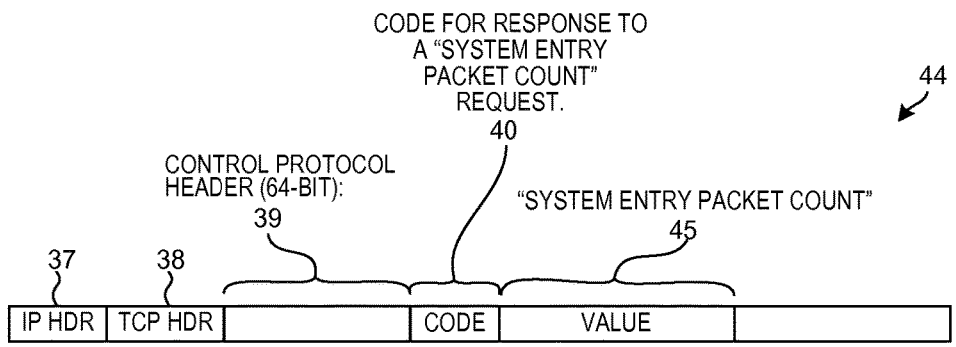
FIG. 13 is a diagram of a system entry count response.

Next (FIG. 11; 402), the entry indicated by the request is read from the match table, and the "entry packet count value" of the entry is obtained. This value is the number of packets that passed to the host and resulted in matches of the indicated entry. Next (FIG. 11; 403) the "entry-to-paths lookup table" 23 is used to determine all the paths that traverse the identified entry. In one example, the path identifiers associated with the entry are read from the table. Next (FIG. 11; 404), the path identifiers are used to read from the "set of bypass packet counts" 25 the count value for each path identified by a path identifier. The thereby obtained looked up "bypass count values" are then summed (FIG. 11; 405), and the sum is added to the "entry packet count value" read from the entry, thereby determining an updated "system entry packet count" (FIG. 11; 406). The value of the entry packet count read from the entry itself does not take into account any packets that should have gone through the entry but rather were bypassed through the NID. These bypass packets are, however, counted in the bypass packet counts for those particular paths. For this reason, the appropriate bypass packet counts are added to the entry packet count read from the entry in order to obtain the correct "system entry packet count" for the entry. The determined "system entry packet count" is then output (FIG. 11; 407) from the NID in a response 44 to the request 36. In the present example, the response 44 is of the form shown in FIG. 13. The response 44 is of the same form as the request, except that the code 40 is a code indicating that the packet is a response returning the value of a particular "system entry packet count". The value of the particular "system entry packet count" is carried in field 45.

Figure 14:
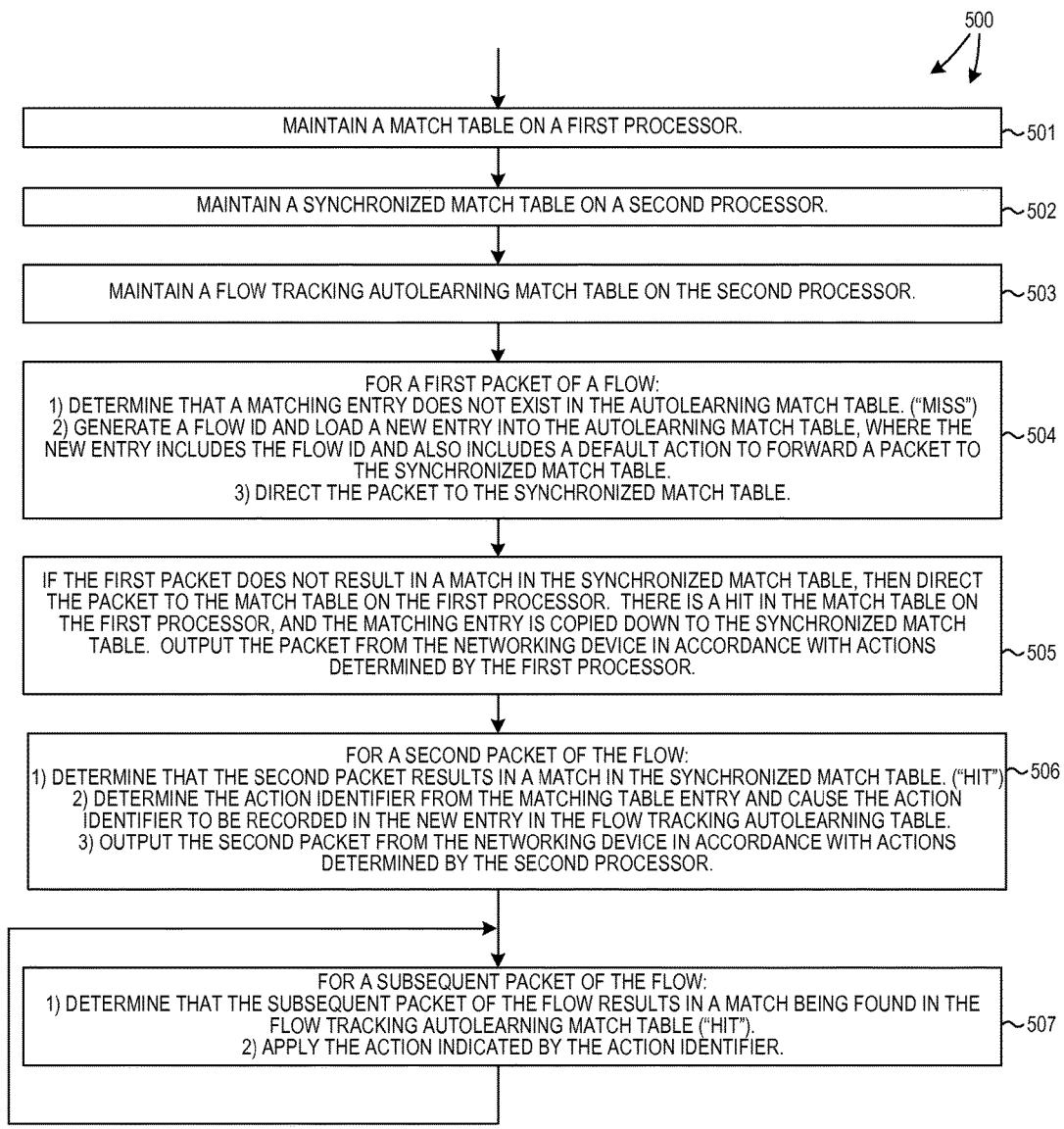
FIG. 14 is a flowchart illustrating a method of loading a Flow Tracking Autolearning Match Table (FTAMT) in accordance with a third novel aspect.
Figure 15:
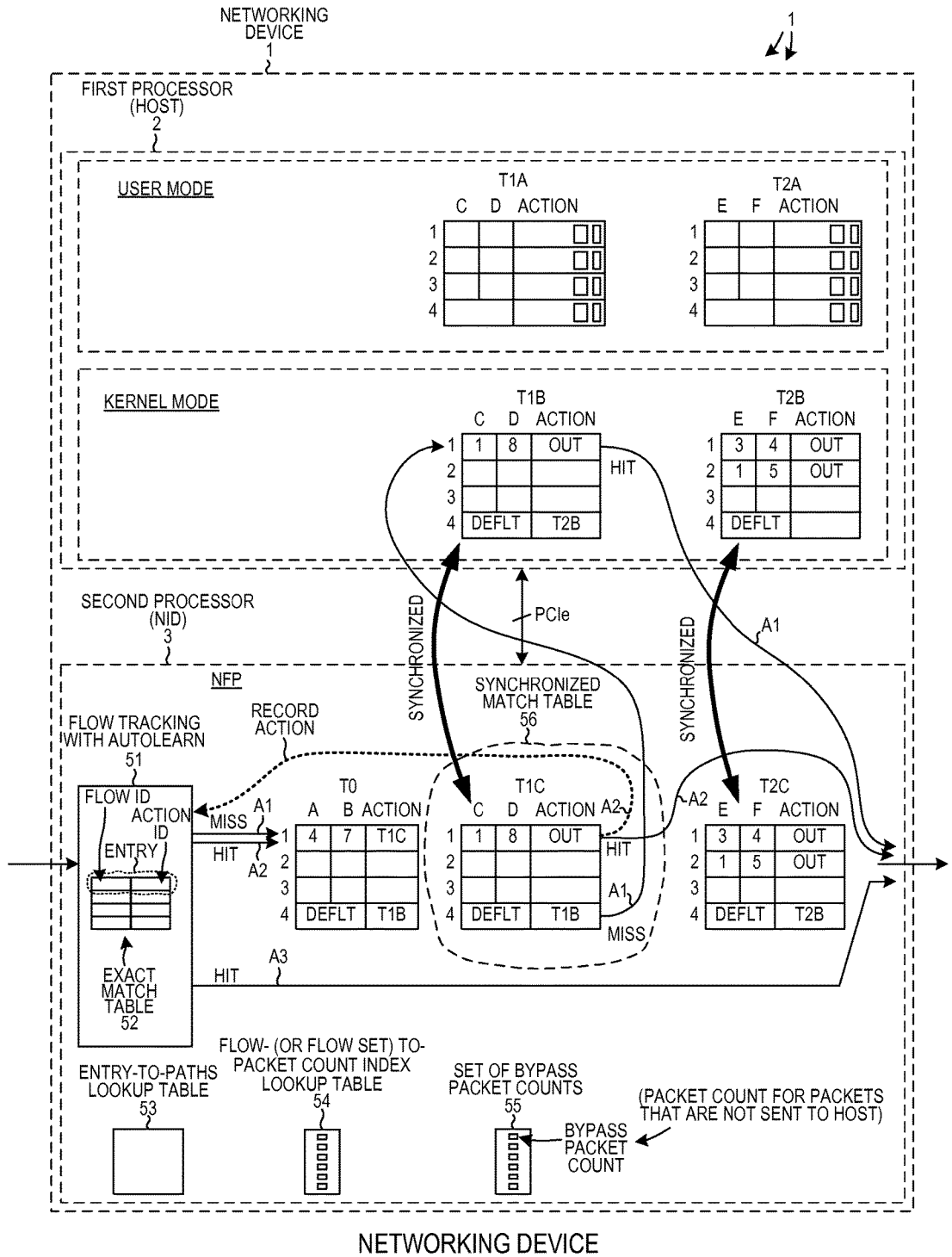
FIG. 15 is a diagram of a networking device that carries out the method of FIG. 14.

FIG. 14 is a flowchart of a method 500 of loading the exact match table 52 of FIG. 15, in accordance with the third novel aspect. A match table (T1B) is maintained in the kernel mode space on the first processor 2 (FIG. 14; 501). A synchronized match table 56 is maintained on the NID of the networking device 1 (second processor) (FIG. 14; 502). The NID also includes a Flow Tracking Autolearning Match Table (FTAMT) 51 (FIG. 14; 503). When the FTAMT 51 is first enabled, the synchronized match table 56 is empty. During operation, the NID of the networking device 1 receives a first packet of a flow ("packet A1"). In response to receiving packet A1, the FTAMT 51 performs a look up operation based on packet information derived from packet A1. The result of the look up operation determines that a matching entry does not exist in the exact match table 52 of FTAMT 51. This is referred to as a "miss". The FTAMT 51 then generates a flow identifier (flow ID) and loads a new entry into the exact match table 52 of FTAMT 51, where the new entry includes the flow ID and includes a default action identifier to forward a packet to the synchronized match table 56. Packet A1 is then sent to synchronized match table T1C 56 (shown in FIG. 15 as line "A1" from FTAMT 51 through match table T0 to synchronized match table 56) (FIG. 14; 504). The default action identifier is an instruction to a processing mechanism in the NID to execute the identified action. The processing mechanism is not shown in FIG. 15. Packet A1 is then used to perform a lookup operation in the synchronized match table T1C. At this point, synchronized match table 56 only stores a default entry.

The look up operation performed by synchronized match table T1C based on packet A1 does not result in a match ("miss"). In response, packet A1 is directed to match table T1B located in kernel mode space on the first processor 2 according to the default action identifier included in the default entry (shown as line "A1" between synchronized matching table T1C and matching table T1B). If the look up operation in match table T1B on the first processor results in a hit, then the matching entry in match table T1B on the first processor is copied down to the synchronized match table T1C 56 on the second processor and packet A1 is output from the networking device 1 according to the action identifier included in the matching entry of match table T1B on the first processor 2 (shown as line "A1" between matching table T1B and the output of networking device 1) (FIG. 14; 505). At this point, the matching entry is now stored in synchronized match table 56 in the second processor 3, as well as being stored in match table T1B in the first processor 2. In this sense, it is said that synchronized match table T1C in the second processor 3 is "synchronized" to match table T1B in the first processor 2.

The NID 3 of the networking device 1 then receives a second packet of the same flow (packet A2). In response to receiving packet A2, the FTAMT 51 performs a look up operation based on packet information derived from packet A2. The result of the look up operation determines that a matching entry does exist in an exact match table 52 of the FTAMT 51. This is referred to as a "hit". The FTAMT 51 then forwards packet A2 based on the action identifier stored in the matching entry of exact match table 52 in FTAMT 51, where the action identifier is a default action to forward a packet to the synchronized match table 56. Packet A2 is then sent to synchronized match table T1C 56 (shown in FIG. 15 as line "A2" from FTAMT 51 through match table T0 to synchronized match table 56). Packet A2 is then used to perform a lookup operation in the synchronized match table T1C. A lookup operation of the synchronized match table may involve masking a portion of the packet thereby generating masked packet information, and examining synchronized entries in the synchronized match table to determine if a synchronized entry includes the masked packet information. In the event that a look up operation performed by synchronized match table T1C based on packet A2 does result in a match, then packet A2 is output from the networking device 1 according to the action identifier of the matching entry (shown as line "A2" between matching table T1C and the output of networking device 1) and the action identifier is recorded in the matching entry in exact match table 52 (shown as line "A2" between synchronized matching table T1C and exact match table 52 of FTAMT 51) (FIG. 14; 506). At this point, the matching entry stored in the exact match table 52 includes the action identifier copied from synchronized match table 56.

The NID 3 of the networking device 1 then receives a third packet of the same flow (packet A3). In response to receiving packet A3, the FTAMT 51 performs a look up operation based on packet information derived from packet A3. The result of the look up operation determines that a matching entry does exist in exact match table 52 of FTAMT 51 (FIG. 14; 507). This is referred to as a "hit". The FTAMT 51 then causes the action identifier of the matching entry in exact match table 52 to be applied (FIG. 14; 507). In one example, the action identifier indicates that the packet A3 is to be output from the networking device 1 without any processing by the host (first processor) 2 (shown as line "A3" between FTAMT 51 and the output of the networking device 1). In this fashion, the FTAMT 51 analyzes the packet and determines that the NID has the capability to handle the packet and to perform the necessary action or actions without any processing by the host (first processor) 2. The NID is made to perform the actions itself and does not forward the packet to the host. The action may, for example, involve software processing carried out by ME processor 16 of FIG. 1. The packet is said to "bypass" the host. The packet may go straight out of the NID without involvement of any other match table on the NID, or the packet may pass through a path on the NID that traverses one or more match tables on the NID.

Although the present invention has been described in connection with certain specific embodiments for instructional purposes, the present invention is not limited thereto. An FTAMT may be realized by describing its operation and functions as set forth above in a hardware description language such as Verilog, or VHDL, or CDL, and then supplying the hardware description language code to a commercially available digital logic hardware synthesis tool that generates a description of an actual hardware circuit layout, and then using the layout to fabricate an integrated circuit version of the FTAMT. Accordingly, various modifications, adaptations, and combinations of various features of the described embodiments can be practiced without departing from the scope of the invention as set forth in the claims.

What is claimed is:

1. A networking device, comprising:
a first processor comprising:
    a match table that stores a plurality of entries; and
a second processor comprising:
    a synchronized match table that stores a plurality of entries, wherein the plurality of entries stored in the synchronized match table is synchronized with a corresponding plurality of entries stored in the match table of the first processor; and
    a flow tracking autolearning match table, wherein a match of a first packet to one of the synchronized entries in the synchronized match table causes an action to be recorded in the flow tracking autolearning match table in association with a flow of the first packet, and wherein the action is recorded without the first processor being first alerted of the recording, and without the first processor first receiving the first packet from the second processor, and without the first processor instructing the flow tracking autolearning match table to record the action, wherein the flow tracking autolearning match table, for the first packet of the flow, generates a Flow Identifier (Flow ID) and stores the Flow ID as part of an entry for the flow and directs the first packet to the synchronized match table for possible matching, and wherein a subsequent packet of the flow results in a hit in the flow tracking autolearning match table and results in the previously recorded action being applied to the subsequent packet.

2. The networking device of claim 1, wherein the networking device includes a host computer and a Network Interface Card (NIC), wherein the first processor is a part of the host computer, wherein the second processor is a part of the Network Interface Card (NIC), and wherein the recording of the action involves storing a copy of the action into the flow tracking autolearning table.

3. The networking device of claim 1, wherein the networking device includes a host computer and a Network Interface Card (NIC), wherein the first processor is a part of the host computer, wherein the second processor is a part of the Network Interface Card (NIC), and wherein the recording of the action involves storing a reference to the action in the flow tracking autolearning table.

4. A networking device, comprising:
a host comprising:
    a first processor; and
    a memory that stores a kernel mode match table, wherein the kernel mode match table stores a plurality of entries; and
a Network Interface Device (NID) that is coupled to the host by a bus, wherein the NID comprises:
    a second processor; and
    an amount of memory, wherein the amount of memory stores:
        a synchronized match table, wherein a plurality of synchronized entries stored in the synchronized match table is synchronized with a corresponding plurality of entries stored in the kernel mode match table of the host; and
        a flow tracking autolearning match table, wherein a match of a first packet to one of the synchronized entries in the synchronized match table causes an action identifier to be recorded in the flow tracking autolearning table in association with a flow of the first packet, wherein a Flow Identifier (Flow ID) is generated for the first packet of the flow and is stored as part of an entry for the flow in the flow tracking autolearning match table, and wherein the synchronized match table is then consulted for possible matching to the first packet, and wherein a subsequent packet of the flow results in a hit in the flow tracking autolearning match table and results in an action identified by the previously recorded action identifier being applied to the subsequent packet.

5. The networking device of claim 4, wherein the amount of memory includes a first memory and a second memory, wherein the flow tracking autolearning match table is stored in the first memory, and wherein the synchronized match table is stored in the second memory.

6. The networking device of claim 4, wherein the memory of the host also stores a user mode match table, wherein the user mode match table is not synchronized to the synchronized match table of the NID.

7. The networking device of claim 4, wherein the flow tracking autolearning match table is an exact match table, wherein the flow tracking autolearning match table stores a plurality of entries, wherein each entry of the flow tracking autolearning match table comprises a Flow ID and an action identifier, and wherein no entry stored in the flow tracking autolearning match table includes any wildcard identifier, don't care bit, or mask bit.

8. The networking device of claim 4, wherein the host does not cause the action identifier to be recorded in the flow tracking autolearning match table but rather the NID causes the action identifier to be recorded in the flow tracking autolearning match table.

9. The networking device of claim 4, wherein the matching of the first packet to a synchronized entry in the synchronized match table involves:
   masking a portion of the first packet thereby generating masked packet information; and
   examining synchronized entries in the synchronized match table to determine if a synchronized entry includes the masked packet information.

10. A method involving a host and Network Interface Device (NID), wherein the NID is coupled to the host via a bus, the method comprising:
   (a) maintaining a kernel mode match table on the host;
   (b) maintaining a synchronized match table on the NID;
   (c) synchronizing the synchronized match table to the kernel mode match table;
   (d) receiving a first packet of a flow onto the NID;
   (e) generating a Flow Identifier (Flow ID) for the flow, wherein the generating is performed on the NID;
   (f) loading an entry for the flow into a flow tracking autolearning match table, wherein the entry includes the Flow ID, wherein the flow tracking autolearning match table is a part of the NID;
   (g) attempting a lookup of the first packet in the synchronized match table thereby identifying a matching synchronized entry, wherein the matching synchronized entry of the synchronized match table includes an action identifier; and
   (h) recording the action identifier in the entry in the flow tracking autolearning match table, wherein (a) is performed by the host and wherein (b) through (h) are performed by the NID.

11. The method of claim 10, wherein the kernel mode match table stores a plurality of entries, wherein the synchronized match table stores a plurality of synchronized entries, and wherein the synchronizing of (c) involves synchronizing each of the plurality of entries of the kernel mode match table to a corresponding one of the plurality of synchronized entries of the synchronized match table.

12. The method of claim 10, further comprising:
   (i) receiving a subsequent packet of the flow onto the NID;
   (j) generating a second Flow Identifier (Flow ID) from the subsequent packet;
   (k) attempting a lookup of the second Flow ID generated in (j) in the flow tracking autolearning match table thereby identifying the entry loaded in (f); and
   (l) retrieving the action identifier recorded in (h) and performing an action indicated by the action identifier.

13. The method of claim 10, wherein the flow tracking autolearning match table is an exact match table, wherein the flow tracking autolearning match table stores a plurality of entries, wherein each entry of the flow tracking autolearning match table comprises a Flow ID and an action identifier, and wherein no entry stored in the flow tracking autolearning match table includes any wildcard identifier, don't care bit, or mask bit.

14. The method of claim 10, wherein the synchronized match table is an exact match table, and wherein an attempted lookup of the first packet in the synchronized match table includes:
   masking a portion of the first packet thereby generating masked packet information; and
   examining synchronized entries in the synchronized match table to determine if a synchronized entry includes the masked packet information.

15. A method comprising:
   (a) maintaining a kernel mode match table on a host;
   (b) maintaining a synchronized match table on a Network Interface Device (NID);
   (c) synchronizing the synchronized match table to the kernel mode match table;
   (d) receiving a first packet of a flow onto the NID;
   (e) generating a Flow Identifier (Flow ID) for the flow, wherein the generating is performed on the NID;
   (f) loading an entry for the flow into a flow tracking autolearning match table, wherein the entry includes the Flow ID;
   (g) attempting a lookup using information derived from the first packet to lookup an action identifier stored in the synchronized match table, wherein the attempted lookup identifies a matching synchronized entry, wherein the matching synchronized entry includes an action identifier; and
   (h) recording the action identifier in the entry in the flow tracking autolearning match table, wherein (a) is performed by the host and wherein (b) through (h) are performed by the NID.

16. The method of claim 15, further comprising:
   (i) receiving a subsequent packet of the flow onto the NID;
   (j) generating a second Flow Identifier (Flow ID) from the subsequent packet;
   (k) attempting a lookup using the second Flow ID generated in (j) in the flow tracking autolearning match table thereby identifying the entry loaded in (f); and
   (l) retrieving the action identifier recorded in (h) and performing an action indicated by the action identifier.

17. The method of claim 16, wherein the action performed in (1) is performed by the NID and is not performed by the host.

18. The method of claim 16, wherein the subsequent packet is processed and is output from the NID without causing any further attempted match table lookups on the NID.

19. The method of claim 15, wherein no subsequent packets of the flow are communicated to the host.

20. The method of claim 15, wherein the synchronized match table is an exact match table, and wherein the attempted lookup of (g) includes:
   masking a portion of the first packet thereby generating masked packet information; and
   examining synchronized entries in the synchronized match table to determine if a synchronized entry includes the masked packet information.

* * * * *